United States Patent [19]

Handel

[11] Patent Number: 5,052,975
[45] Date of Patent: Oct. 1, 1991

[54] AUTOMATIC COMBING

[75] Inventor: Gary A. Handel, Madison, Wis.

[73] Assignee: Oscar Mayer Foods Corporation, Madison, Wis.

[21] Appl. No.: 538,365

[22] Filed: Jun. 14, 1990

[51] Int. Cl.$^5$ .............................................. A22C 17/02
[52] U.S. Cl. ................................... 452/187; 452/182; 452/193; 211/49.1
[58] Field of Search ............... 452/187, 185, 182, 183, 452/193, 177; 211/49.1, 196

[56] References Cited

U.S. PATENT DOCUMENTS

| | | | |
|---|---|---|---|
| 1,967,870 | 7/1934 | Covey | 452/193 |
| 2,412,233 | 12/1946 | Tominello | 452/193 |
| 3,405,422 | 10/1968 | Sico et al. | 452/198 |
| 4,106,174 | 8/1978 | Ilines | 211/49.1 |
| 4,172,305 | 10/1979 | Henebry et al. | 452/193 |
| 4,985,963 | 1/1991 | Norling | 452/187 |

Primary Examiner—Willis Little
Attorney, Agent, or Firm—Lockwood, Alex, Fitzgibbon & Cummings

[57] ABSTRACT

An apparatus and method are provided for combing bacon bellies or similar generally compressible items in order to transform a conveyed flow of those items into a stream of those items, each of which is suspended from a comb which impales the item. The thus combed items are then suitable for transport along track means to subject the item to treatment conditions such as transporting them into smoking and flavoring environments. The apparatus and method are particularly well suited for combing pork bellies and as a component of a commercial line in which pork bellies are processed into sliced and packaged bacon products.

20 Claims, 4 Drawing Sheets

AUTOMATIC COMBING

BACKGROUND AND DESCRIPTION OF THE INVENTION

The present invention generally relates to an apparatus and method for automatically combing bacon bellies and the like. More particularly, in its preferred form, the invention relates to an apparatus and method for automatically impaling a pork belly with a comb of the type that is used to suspend the belly during processing thereof within a bacon processing facility. The apparatus and method proceed to index a comb for each belly within a stream of bellies, thus performing the function of transforming the stream of bellies from a stream supported by a surface such as a conveyor or the like to a stream of pork bellies which are suspended from a series of combs for transporting the bellies along an overhead track system.

During the course of handling items in food processing operations or the like, it is at times desirable to have those items suspended from a generally non-massive device such as a hooking member or a comb in order that substantially the entire item being processed is substantially unobstructed by the suspending means. In this manner, substantially all surfaces of the item can be treated or otherwise processed at substantially the same time and under substantially the same processing conditions, for example by being suspended within a treating or processing atmosphere. A particularly important example of a situation in which such a function must be performed is during the processing of raw or green pork bellies into bacon bellies for processing same into slabs of bacon which are then sliced and packaged. One of the stages along the way of this processing involves subjecting the pork bellies to an atmosphere in order to smoke and/or flavor the bellies into a bacon slab having a particular desired flavor and/or smoked consistency and appearance.

In the typical bacon processing plant, this belly suspension function is achieved by skewering or impaling each bacon belly with a so-called comb, which is a hook-like device that typically includes a plurality of generally parallel pointed surfaces which enter into the belly. Each of these combs has a suspension end generally opposite to the pointed surfaces which impale the belly, and this suspension end is designed to be received within an overhead track system or the like so that the impaled bellies can be suspended from and move along the track system by means of the comb.

Often this impaling or "combing" of the bellies and the like is done manually. Repetitive actions of this type have been attributed to the onset of ailments such as carpel-tunnel syndrome. Additionally, manual combing can bring about a somewhat inconsistent placement of the combs within the bellies such that one belly-and-comb assembly can be a good assembly which adequately supports the belly, whereas other manually formed bacon-and-comb assemblies do not adequately support the entirety of the bacon belly, leading to misshapen bellies and consequent yield losses when the resulting non-uniform belly is subsequently sliced.

With more particular reference to the problems associated with inconsistent belly combing, in the typical combing operation, the pointed portions or teeth of the comb impale one end portion of the belly, typically near the edge thereof. This is the end from which the belly will be suspended during the processing operations which are carried out while the belly is combed and suspended from the overhead rail system by the comb. If the combing operation is not performed properly, a less than adequate amount of the belly is impaled, the belly will not be adequately supported, and a portion thereof will sag or droop. It is desirable for a belly to be as close as possible to a generally rectangular shape so that, when the belly is later sliced, slices of generally uniform length will be formed. If a misshaped belly end is sliced, the length of each slice will vary somewhat depending upon the shape of the belly being sliced. For example, if the combing does not adequately support the full width of the belly, such as at its side end portions, those side end portions will tend to sag during the combed suspension and processing, and when that portion of the belly is subsequently sliced, a short or misshapen slice will be formed since that portion of the belly does not extend the full width of the belly due to the sagging phenomenon. Attempts to properly comb the belly so it is properly supported by the comb are particularly difficult when the end portion of the belly to be combed is not suitably squared off or exhibits unusually large creases or portions where meat is not present.

In certain processing situations, it is desired to separate the items being processed such as bacon bellies and the like into different classes of items or products. For example, it might be desirable to separate bacon bellies into those of differing sizes and/or weights and/or fat-to-lean ratios. In those situations, it would be desirable that the separation take place at a location after the items have been combed. It is therefore useful to provide a system in which the combed items can be segregated according to desired criteria.

It has been found that, by proceeding in accordance with the present invention, an automatic combing operation can be performed in order to eliminate tedious and difficult manual labor and in order to minimize inadequate combing of less than perfectly uniform bacon bellies, while at the same time provided for enhanced throughput and the ability to separate bellies and the like which fall into different categories or classes of product. The enhanced uniformity aspect of the invention leads to enhanced yield capabilities.

In summary, the present invention is directed to an automatic combing apparatus and method whereby an item such as a food item on the order of a bacon belly and the like is fed to an impaling location at which a food item is supported on one side and is exposed on its opposite side. A comb having at least one impaling tooth is positioned at a location along the exposed surface of the item, after which a mechanism applies a force onto the comb until the thus positioned impaling tooth enters into and skewers the item. In a typical combing situation, the comb will have a plurality of generally parallel impaling teeth, and substantially all of them will generally simultaneously enter the item in order to impale a substantially full width of one end portion of the item being combed. After impaling has been completed, a mechanism is provided for moving the comb and its impaled item away from the impaling location and to a location at which the item can be suspended from the comb. The apparatus repeats this procedure so that a stream of items are thus combed for suspension and further processing as desired.

It is a general object of the present invention to provide an improved apparatus and method for combing a supply of items or articles such as pork bellies.

Another object of the present invention is to provide an improved apparatus and method for automatically transforming a stream of bacon bellies supported from below to a stream of bellies supported in hanging fashion.

Another object of this invention is to provide an improved apparatus and method for providing an automatic combing operation of enhanced throughput while providing the potential for reduced operator time requirements.

Another object of the present invention is to provide an improved combing apparatus and method that brings about a more consistent placement of the combs into items such as pork bellies, resulting in higher yields of processed products thus produced.

Another object of this invention is to provide an automatic apparatus and method for combing whereby circumstances believed to be associated with ailments such as carpel-tunnel syndrome are eliminated.

Another object of this invention is to provide a combing apparatus and method suitable for incorporation within an automatic line for processing raw or green pork bellies into sliced and packaged bacon products.

These and other objects, features and advantages of the present invention will be clearly understood through a consideration of the following detailed description.

BRIEF DESCRIPTION OF THE DRAWINGS

In the course of this description, reference will be made to the drawings, wherein.

DESCRIPTION OF THE PARTICULAR EMBODIMENTS

Figure 1:
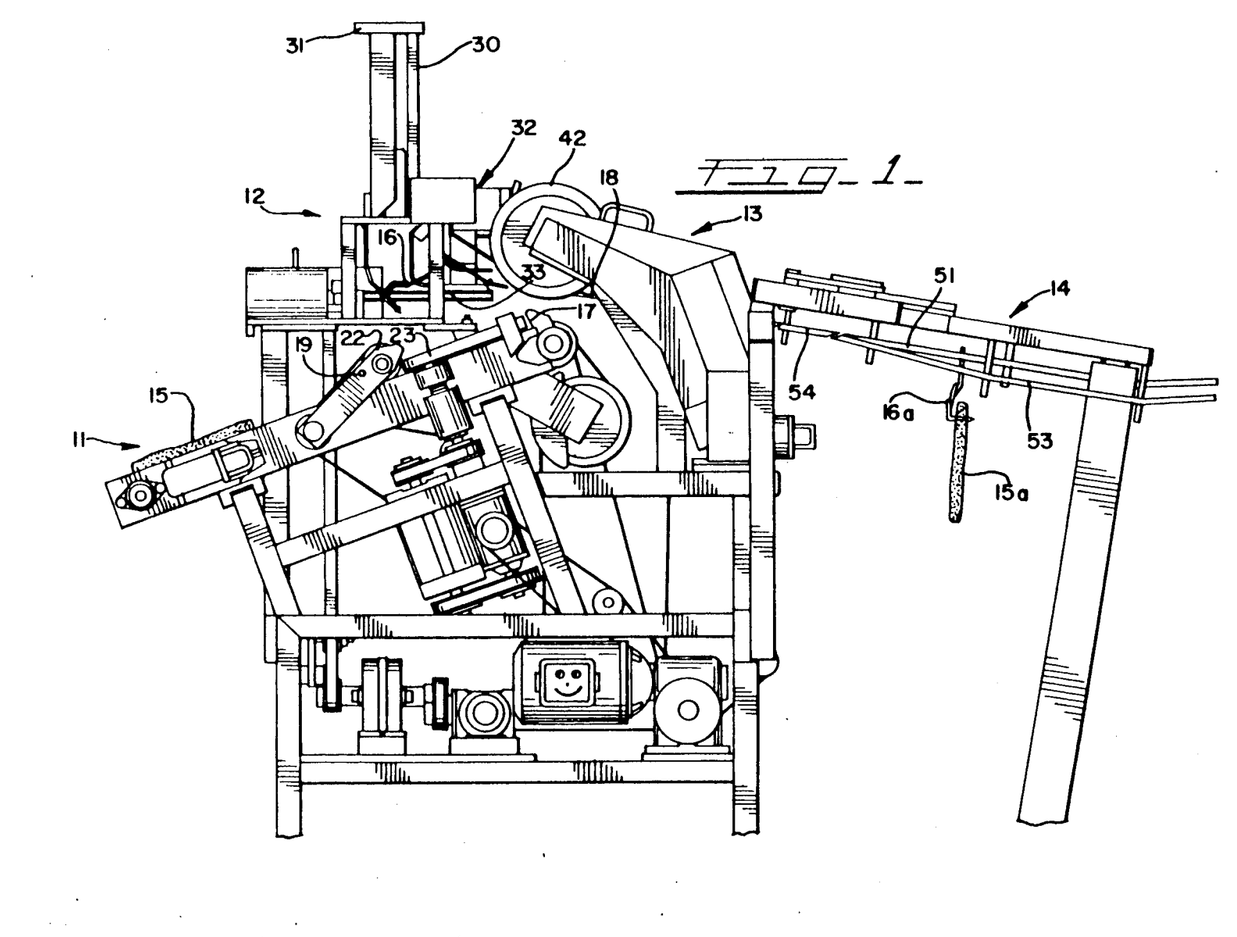
FIG. 1 a side elevational view of an apparatus including features according to the present invention.

FIG. 1 illustrates a suitable arrangement for an automatic combing system according to the present invention. The illustrated system includes a feed conveyor assembly, generally designated as 11, a comb supply assembly, generally designated as 12, a force application assembly, generally designated as 13, and a track communication assembly, generally designated as 14. With this arrangement, a stream of pork bellies and the like 15 are fed onto the feed conveyor assembly 11, either manually or from the conveyor or the like of a suitable upstream apparatus (not shown). As will be discussed in greater detail hereinafter, a comb member 16 is simultaneously fed by the comb supply assembly 12 such that the comb member 16 engages the belly 15 at a location just upstream of a detainer 17 which is located at the downstream end of the feed conveyor assembly 11. The force applying assembly 13 then applies a generally downwardly directed force onto the comb member 16 to ensure that the comb member 16 impales the leading end portion of the belly 15. The comb member 16 rides along a run 18 of the track communication assembly 14 for eventual suspension of belly 15a from a comb member 16a. The thus suspended belly is then ready for transport to downstream processing areas for subjecting same to needed treatments such as those for flavoring and smoking the belly.

Figure 2:
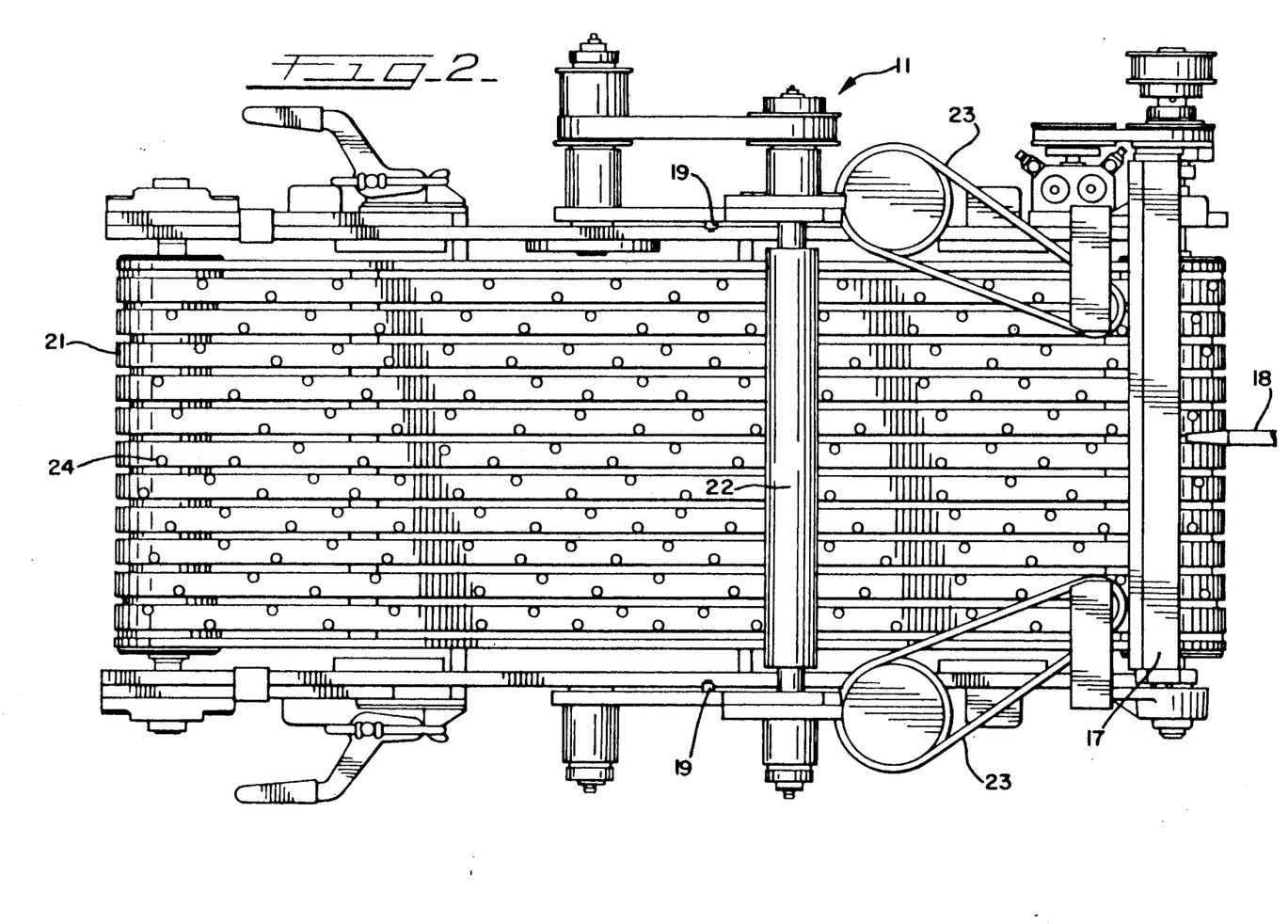
FIG. 2 is a top plan view of the conveyor assembly illustrated in the apparatus shown in FIG. 1.

The feed conveyor assembly 11 is shown in some greater detail in FIG. 2. A flow or continuous stream of bellies or the like 15 (FIG. 1) is conveyed toward the downstream end of the feed conveyor assembly 11, or to the right as illustrated in FIG. 2. A sensor 19 can be provided in order to initiate the timing sequence of the apparatus by informing suitable memory means, such as a central processing unit, that a belly 15 is on its way to the area of the detainer 17. A typical sensor 19 will take the form of an electric eye located along the conveyor run. In a preferred arrangement, the leading edge of the belly 15 initiates the timing of the movement of conveyor belts 21 until the belly is conveyed and pressed against the detainer 17. This can be accomplished by having a suitable time delay programmed into the central processing unit or the like. Alternatively, although typically not necessary, another sensor or the like (not shown) can be located at a downstream location along the feed conveyor assembly 11 in order to provide a signal that a belly has reached that location. Details regarding a central processing unit such as a microprocessor, a chip, a computer or the like are not shown inasmuch as the details of the signal generators, data processors and signal transmitters are well within the level of skill in the art. Similarly, various leads between the sensors and the central processing unit are omitted and will be well appreciated by the art.

Figure 4:
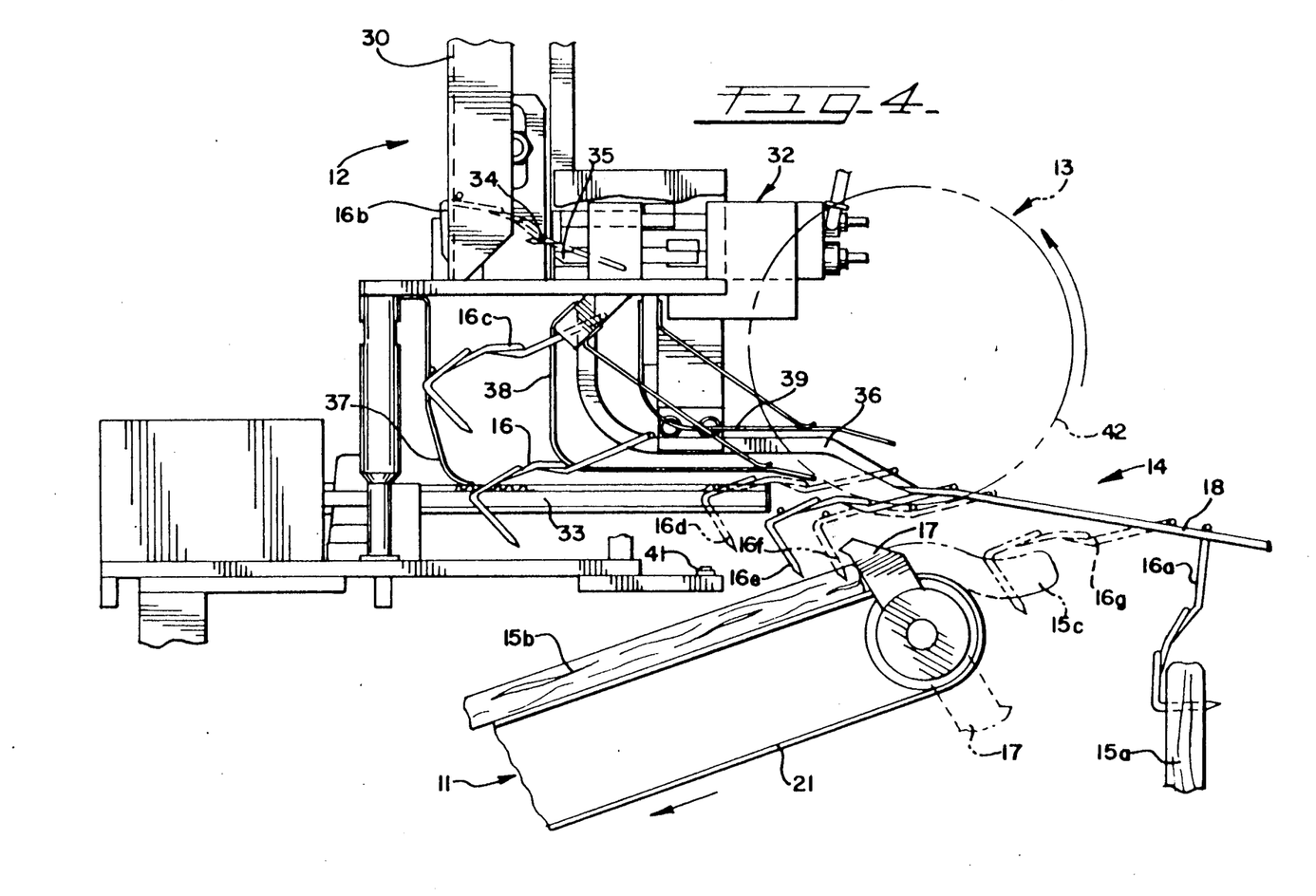
FIG. 4 is an enlarged, side elevational view of a portion of the apparatus of FIG. 1, shown in an operating mode and with portions thereof being omitted or broken away.

With more particular reference to the preferred arrangement shown in FIG. 2, when the belly 15 is "seen" or otherwise detected by the sensors 19, an internal clock is started, and the detainer 17 is raised to the position illustrated in FIGS. 1, 2 and 4 from its lowered position shown in phantom in FIG. 4. The belly 15 passes under an overhead feed roller assembly 22, and the belly is fed between the roller assembly 22 and the belts 21 in order to thereby provide additional driving force for moving the belly to and into the raised detainer 17. It is preferred that each of the conveyor belts 21 include a plurality of soft projections 24 which assist in preventing slippage of the belly with respect to the conveyor belts 21.

Also included in the preferred embodiment which is illustrated are a pair of squeeze belt assemblies 23. As can be seen in FIG. 2, these belt assemblies 23 are positioned to be non-parallel to the conveyor run in order to provide a side belt pathway which tapers in the downstream direction such that the belts taper down to a pathway having a width which is somewhat less than the typical width of bellies being processed through the line. The objective is to provide a squeezing force along the leading portion of the longitudinal edges of each belly. This force, when combined with the driving force provided by the conveyor and its overhead feed roller assembly 22 and with the stopping force provided by the detainer 17, combine to assist in squaring off the leading end portion of each belly when needed. This assists in presenting a belly position and shape which are enhanced in uniformity, which presents an improved profile at the leading end of the belly for receiving the comb 16. Preferably, the space between the downstream ends of the squeeze belt assemblies 23 is just slightly greater than the width of the comb members 16. It will be appreciated that the function of the combination including the detainer 17 is enhanced by having the conveyor belts 21 continue to run for a short period of time (typically less than a second) after the belly first engages the detain bar, thus compacting and squaring up the leading edge of the belly where the comb will be inserted.

Before a comb is presented for insertion into the leading end portion of a belly or the like, it is indexed from a group of combs which are stored in any suitable manner, such as within a magazine assembly 30 of the comb supply assembly 12. In the illustrated magazine assembly 30, a plurality of combs are stacked generally one upon another. Preferably, the magazine 30 includes an entry end gauge 31 which prevents entry into the magazine of misshapen or improperly sized combs in order to ensure that only combs of the proper dimensions and shape enter the magazine assembly 30. The magazine assembly 30 can be a permanent fixture, or it can be a clip type of arrangement wherein a clip full of stacked combs replaces a previously emptied clip.

An escapement mechanism, generally designated as 32, releases a comb from the magazine assembly 30, and this comb falls onto a positive conveying mechanism such as the illustrated lead screw 33 which positively conveys the comb 16 to the location proximate to that at which it first engages the belly.

Further details of the operation of the comb supply assembly 12 can be seen from FIG. 4. The bottommost comb 16b from the magazine stack is supported by an upper finger 34 controlled by the escapement mechanism 32. This holds back the combs in the magazine while another comb (not shown) which had been positioned into engagement with the lower finger 35 is released by movement of that lower finger 35 by the action of the escapement mechanism 32. The thus released comb 16c is then in position for movement onto the lead screw 33. Escapement mechanisms of the type used for moving the upper finger 34 and the lower finger 35 are available, and the details of their operation are not described herein. For example, a suitable escapement mechanism is a model No. 13610-1-0102 from PHD Inc.

Comb 16c falls onto a rail 36. Its somewhat horizontal orientation can be maintained by springs 37 and 38, with the comb 16 dropping onto an upstream end portion of the lead screw 33. This comb 16 is conveyed by the lead screw 33, preferably while being guided by the spring 38, the rail 36, and another spring 39. This feeding continues until comb 16d reaches a staging location, which is indicated by a suitable device such as a proximity switch 41, which preferably takes the form of a metal detector. Comb 16d is thus at a staging location where it can stop momentarily and wait for a signal that a belly 15b is in position at the downstream end portion of the feed conveyor assembly 11. Typically, the comb 16 drops onto the lead screw 33 when the comb 16d reaches this staging location, thereby providing a continuous flow of combs from the magazine assembly 30 through to the staging location.

Next, the lead screw 33 is again activated and delivers the staged comb off of the end of the lead screw 33 as a comb 16e which initially engages the belly 15b. Preferably, this placement is controlled somewhat by the spring 39 which avoids excessive movement of the comb when it moves from the position of comb 16d to the 33 in order to deliver the comb 16e is accomplished when a signal is received that the belly 15b is in position for receiving the comb 16e, such as by operation of the sensor 19 and a predetermined time delay.

With the comb 16e being thus in position, steps are taken to impale the belly with the comb. This is preferably facilitated by the force applying assembly 13. This assembly typically includes one or more rubber-coated press wheels 42, illustrated in phantom in FIG. 4. As can be seen in that Figure, the press wheel 42 engages a back side portion of a comb 16f in order to complete the impaling of same into the belly 15b. The impaled belly 15c is then moved off of the feed conveyor assembly 11, typically by restarting the conveyor belts 21, which belly 15c is guided off of the feed conveyor assembly 11 by its impaling comb 16g. After the belly 15c clears the feed conveyor assembly 11, the belly 15a is suspended by the comb 16a from the run 18. It is preferred that the conveyor belts 21 begin to move while the comb 16f is in the process of passing into the belly 15b inasmuch as the incline of the conveyor belts 21 provides the bottom portion of a narrowing pathway which accomplishes the desired impaling operation. In a typical arrangement, by this stage of the operation the detainer 17 will have been rotated out of the way of the off-feed path of the bellies.

Figure 3:
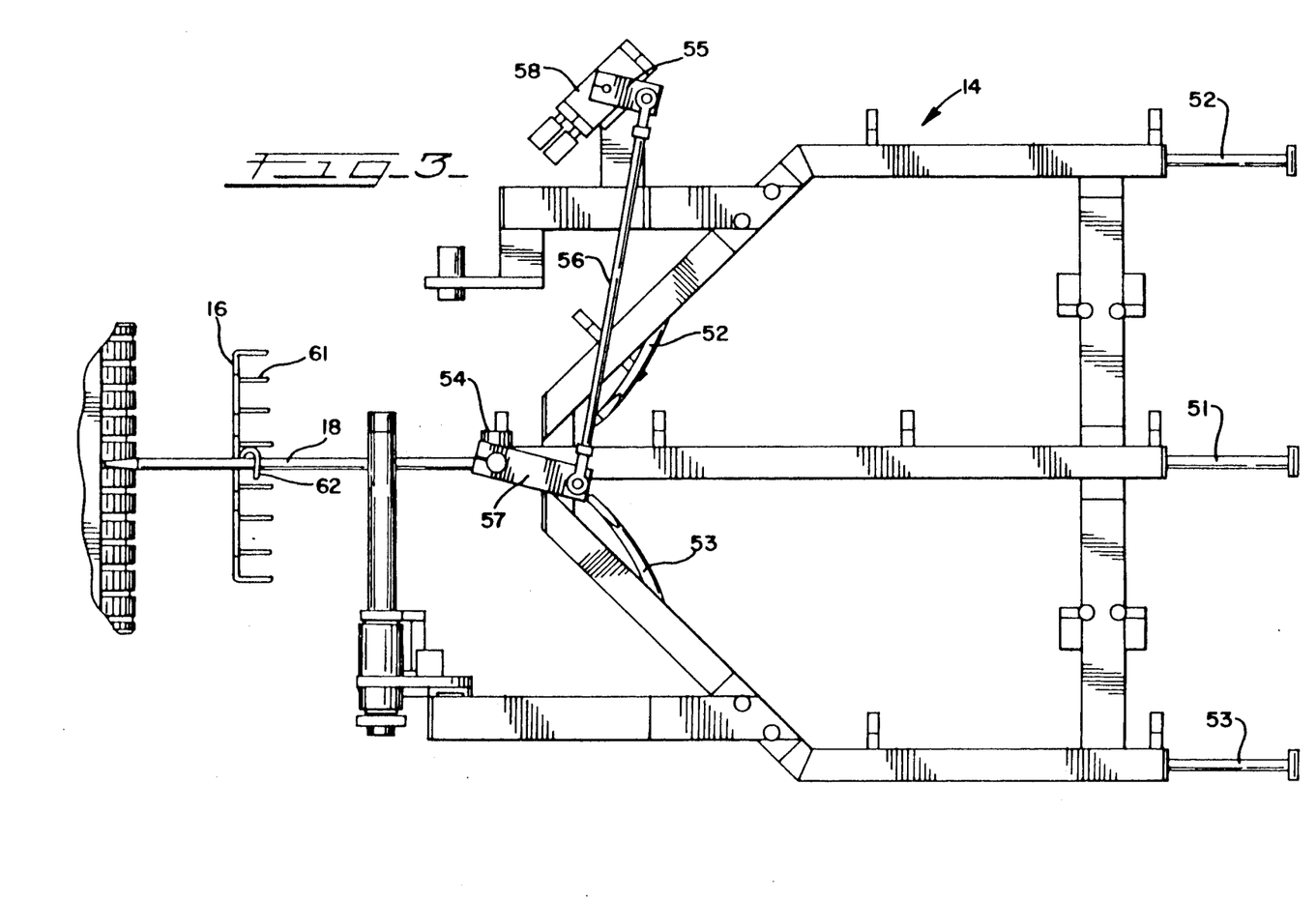
FIG. 3 is a top plan view of a comb suspension assembly as generally illustrated in FIG. 1.

The assembly of belly 15a and comb 16a moves along the run 18. Typically, run 18 is a downwardly inclined bar, and the combed belly 15a moves therealong in a downstream direction under the influence of gravity, although positive traction assemblies can be used if desired. If the apparatus is to be used in conjunction with a single overhead track system, run 18 simply feeds onto the track system, and the bellies are subsequently processed as desired. With the assembly illustrated in FIG. 3, each combed belly can be diverted onto one of a plurality of runs. FIG. 3 illustrates a multiple track arrangement having a center lane 51, a left side lane 52, and a right side lane 53. Upstream of each of the lanes 51, 52, 53 is a diverter assembly. Details of the structure can also be seen in FIG. 1. A flipper rod assembly 54 moves among respective leading edges of the lanes 51, 52, 53. A typical mechanism for accomplishing this movement includes an actuating arm 55, a rod 56, and an actuated arm 57. A suitable well-known mechanism such as a rotary actuator 58 rotates the actuating arm 55 to one of the three selected positions. A suitable three position rotary actuator is a model No. 0183752-1-01 available from PHD Inc.

A suitable comb assembly of the type that is used in the ;eat processing industry can be seen in greater detail in FIG. 3. Comb 16 includes a plurality of tines 61 projecting at generally right angles from he rest of the comb member 16. A hanger hook 62 is also included for suspending same from the various components of the apparatus, such as the run 18. Each of the lines 61 is usually long enough to pass through a belly of a typical thickness, but not extend very far beyond the belly.

While particular embodiments of the invention have been described, it will be appreciated to those skilled in the art that various modifications thereof may be made without departing from the true spirit and scope of the invention. Accordingly, it is intended by the appended claims to cover all such modifications and equivalents which embody the inventive features as defined in the claims.

I claim:

1. An automatic combing apparatus for impaling a food item and the like with a comb member having at least one impaling tooth, the apparatus comprising:

means for feeding at least one food item and the like from a flow of food items and the like to an impaling location at which said item is supported on at least one side thereof;

means for providing a plurality of comb members and for indexing one of said comb members for each of said at least one item to said impaling locations said providing means orienting said comb member whereby an impaling tooth thereof is positioned for entering into the side of said item which is generally opposite to said supported one side thereof;

means for applying a force onto said comb member whereby said positioned impaling tooth enters into and impales the item; and means for moving said thus impaled item away from said impaling location, whereby said impaled item and the comb impaling same are removed from said impaling location and said impaled item is suspended by said comb.

2. The automatic combing apparatus according to claim 1 wherein said feeding means includes means for exerting pressure onto at least one edge of the item, and wherein the item is generally shapable and elastic whereby the pressure exerting means at least temporarily enhances a generally rectangular shape of the leading end of the item.

3. The automatic combing apparatus according to claim 2, wherein said pressure exerting means engages and exerts pressure against three edges of said item, said item being a pork belly, whereby the leading edge portion of the pork belly is at least temporarily reshaped to have an enhanced rectangular shape characteristic.

4. The automatic combing apparatus according to claim 2, wherein said pressure applying means includes a detainer assembly for engaging the leading edge of the item, in combination with said feeding means which includes conveyor means for moving the item into the detainer assembly until said leading edge of the item is changed in shape to be in greater conformity with a bar portion of said detainer assembly.

5. The automatic combing apparatus according to claim 3, wherein said pressure applying means includes a detainer assembly for engaging the leading edge of the item, in combination with said feeding means which includes conveyor means for moving the item into the detainer assembly until said leading edge of the item is changed in shape to be in greater conformity with a bar portion of said detainer assembly, and wherein said pressure applying means further includes a pair of squeeze belt assemblies for exerting pressure onto at least the leading end portion of opposing longitudinal sides of the item.

6. The automatic combing apparatus according to claim 1, wherein said comb providing means includes a lead screw for receiving a comb and transmitting it to a staging location proximate to said impaling location.

7. The automatic combing apparatus according to claim 1, wherein said force applying means includes a rotating member for engaging a surface of the comb which is generally opposite to the impaling direction of the impaling tooth.

8. The automatic combing apparatus according to claim 1, wherein said means for moving the impaled item away from the impaling location includes an inclined run which slidingly receives an end portion of the comb which is opposite to the impaling tooth of the comb.

9. The automatic combing apparatus according to claim 1, further including diverter means downstream of said impaled item moving means and multiple overhead track means downstream of said diverter means, said diverter means being for directing the impaled items to any one of said overhead track means.

10. The automatic combing apparatus according to claim 1, wherein said feeding means includes an upwardly inclined conveyor assembly, and said force applying means includes an engagement member positioned at the uppermost end of said conveyor assembly, whereby said impaling tooth enters into said item by wedging said comb and said item which are at the impaling location between said force applying means and said uppermost end of the conveyor assembly.

11. An automatic combing apparatus for impaling a stream of pork bellies with a comb member having a plurality of impaling teeth, the apparatus comprising:

means for feeding at least one pork belly from a flow of pork bellies to an impaling location at which said belly is supported on its bottom side;

means for providing a plurality of comb members and for indexing one of said comb members for each of said at least one pork belly to said impaling location, said providing means orienting said comb member whereby a plurality of generally parallel impaling teeth thereof are positioned for entering into a location on the top side of said pork belly;

means for applying a force onto said comb member whereby said positioned impaling teeth enter into and impale the belly; and means for moving said thus impaled belly away from said impaling location, whereby said impaled belly and the comb impaling same are removed from said impaling location and said impaled belly is suspended by said comb.

12. The automatic combing apparatus according to claim 11, wherein said feeding means includes means for exerting pressure onto at least the leading edge of the pork belly, and wherein the belly is generally shapable and elastic whereby the pressure exerting means at least temporarily enhances a generally rectangular shape of the end portion of the belly including said leading edge.

13. The automatic combing apparatus according to claim 12, wherein said pressure applying means includes a detainer assembly for engaging the leading edge of the belly, in combination with said feeding means which includes conveyor means for moving the item into the detainer assembly until said leading edge of the item is changed in shape to be in greater conformity with a bar portion of said detainer assembly.

14. The automatic combing apparatus according to claim 13, wherein said pressure applying means further includes a pair of squeeze belt assemblies for exerting pressure onto at least the leading end portion of opposing longitudinal side edges of the belly, said pair of squeeze belt assemblies having non-parallel, generally opposing surfaces that provide a pathway therebetween which tapers down to a width on the order of and greater than span of the impaling teeth of the comb.

15. The automatic combing apparatus according to claim 11, wherein said comb providing means includes a lead screw for receiving a comb from a stack thereof and transmitting it to a staging location proximate to said impaling location, said comb providing means further including means for moving said comb from the staging location and onto the belly at the impaling location.

16. The automatic combing apparatus according to claim 15, further including rail and spring means for guiding said combs one at a time in series from said stack thereof, onto and along said lead screw and onto the belly at the impaling location.

17. An automatic combing process for impaling a food item and the like with a comb having at least one impaling tooth, the method comprising:

feeding at least one food item and the like of a flow of said items to an impaling location at which said item is supported on at least one side thereof;

providing a plurality of combs, and indexing one of said combs for each said at least one item, said indexing step presenting said comb to said impaling location and orienting the comb whereby at least one impaling tooth thereof is positioned for entry into the side of the item which is generally opposite to the side thereof which is supported at the impaling location;

applying a force whereby the comb moves toward the item and its impaling tooth impales the item; and moving the thus impaled item away from the impaling location in order to remove the impaled item from the impaling location such that the impaled item is suspended from the comb.

18. The automatic combing process according to claim 17, wherein said feeding step includes exerting pressure onto at least one edge of the item, and wherein the item is generally shapable and elastic whereby the pressure exerting step at least temporarily enhances a generally rectangular shape of the leading end of the item.

19. The automatic combing process according to claim 18, wherein said pressure exerting step engages and exerts pressure against three edges of said item, said item being a pork belly, and at least temporarily reshaping the leading edge portion of the pork belly to have an enhanced rectangular shape characteristic.

20. The automatic combing apparatus according to claim 19, wherein said pressure applying step includes engaging the leading edge of the item with a detainer bar, in combination with said feeding step which includes conveying the item into the detainer bar until said leading edge of the item is changed in shape to be in greater conformity with a bar portion of said detainer assembly, and wherein said pressure applying step further includes exerting pressure onto at least the leading end portion of opposing longitudinal sides of the item.

* * * * *

UNITED STATES PATENT AND TRADEMARK OFFICE
CERTIFICATE OF CORRECTION

PATENT NO. : 5,052,975
DATED : October 1, 1991
INVENTOR(S) : Gary A. Handel

It is certified that error appears in the above-indentified patent and that said Letters Patent is hereby corrected as shown below:

```
Col. 2, line 42, "provided" should read --providing--.
Col. 5, line 66, "the 33" should read --the position of comb 16e.
     This movement of the lead screw 33--.
Col. 6, line 49, ";eat" should read --meat--; line 51, "he" should
     read --the--; line 54, "lines" should read --tines.
Col. 7, line 7, "locations said" should read --location, said--;
     line 21, "claim 1" should read --claim 1,--.
```

Signed and Sealed this

Twenty-seventh Day of December, 1994

Attest:

BRUCE LEHMAN

Attesting Officer        Commissioner of Patents and Trademarks